(12) United States Patent
Holmes et al.

(10) Patent No.: US 10,055,105 B2
(45) Date of Patent: Aug. 21, 2018

(54) METHOD AND SYSTEM FOR ENABLING INTERACTION WITH A PLURALITY OF APPLICATIONS USING A SINGLE USER INTERFACE

(71) Applicant: Calgary Scientific Inc., Calgary (CA)

(72) Inventors: Colin John Holmes, Vancouver, WA (US); Monroe Milas Thomas, Toronto (CA); Glen Lehmann, Cremona (CA); Pierre Joseph Lemire, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 233 days.

(21) Appl. No.: 14/872,757

(22) Filed: Oct. 1, 2015

(65) Prior Publication Data

US 2016/0054897 A1   Feb. 25, 2016

Related U.S. Application Data

(63) Continuation-in-part of application No. 12/658,080, filed on Feb. 2, 2010, now abandoned, and a
(Continued)

(51) Int. Cl.
*G06F 15/00* (2006.01)
*G06F 13/00* (2006.01)
(Continued)

(52) U.S. Cl.
CPC ........ *G06F 3/04842* (2013.01); *G06F 3/0481* (2013.01); *G06F 3/04847* (2013.01);
(Continued)

(58) Field of Classification Search
USPC .......................... 715/763–765, 740, 748, 780
See application file for complete search history.

(56) References Cited

U.S. PATENT DOCUMENTS

| 4,975,690 A | 12/1990 | Torres |
| 5,345,550 A | 9/1994 | Bloomfield |

(Continued)

FOREIGN PATENT DOCUMENTS

| CN | 101539932 | 9/2009 |
| CN | 101883097 | 11/2010 |

(Continued)

OTHER PUBLICATIONS

Search Report and Written Opinion, dated Nov. 16, 2015, received in connection with SG Application No. 2013087150.
(Continued)

*Primary Examiner* — Kevin Nguyen
(74) *Attorney, Agent, or Firm* — Meunier Carlin & Curfman LLC

(57) ABSTRACT

An example method for providing simultaneous interaction with a plurality of application programs is described herein. The method includes providing a remote access framework for enabling a client to remotely access the application programs over a network, receiving a communication from the client through the remote access framework, and maintaining a state model within the remote access framework. The state model includes respective application states of the application programs. The method also includes, using the state model, linking interactive functionalities of the application programs, and generating display data indicative of a single user interface including the plurality of application programs. The method further includes communicating the display data to the client through the remote access framework.

20 Claims, 8 Drawing Sheets

Related U.S. Application Data continuation-in-part of application No. 13/586,007, filed on Aug. 15, 2012.

(60) Provisional application No. 61/202,168, filed on Feb. 3, 2009, provisional application No. 61/523,632, filed on Aug. 15, 2011, provisional application No. 61/523,644, filed on Aug. 15, 2011.

(51) Int. Cl.
  *G06F 3/0484* (2013.01)
  *H04L 29/08* (2006.01)
  *G06F 9/451* (2018.01)
  *G06F 9/44* (2018.01)
  *G06F 3/0481* (2013.01)

(52) U.S. Cl.
  CPC ............ *G06F 9/4445* (2013.01); *G06F 9/452* (2018.02); *H04L 67/10* (2013.01); *G06F 2209/545* (2013.01)

(56) References Cited

U.S. PATENT DOCUMENTS

| | | |
|---|---|---|
| 5,491,800 A | 2/1996 | Goldsmith et al. |
| 5,555,003 A | 9/1996 | Montgomery et al. |
| 5,742,778 A | 4/1998 | Hao et al. |
| 5,844,553 A | 12/1998 | Hao et al. |
| 5,870,759 A | 2/1999 | Bauer et al. |
| 5,903,725 A | 5/1999 | Colyer |
| 5,909,545 A | 6/1999 | Frese, II et al. |
| 5,920,311 A | 7/1999 | Anthias |
| 5,978,842 A | 11/1999 | Noble et al. |
| 6,045,048 A | 4/2000 | Wilz et al. |
| 6,061,689 A | 5/2000 | Chang et al. |
| 6,075,531 A | 6/2000 | DeStefano |
| 6,141,698 A | 10/2000 | Krishnan et al. |
| 6,145,098 A | 11/2000 | Nouri et al. |
| 6,175,869 B1 | 1/2001 | Ahuja et al. |
| 6,253,228 B1 | 6/2001 | Ferris et al. |
| 6,343,313 B1 | 1/2002 | Salesky et al. |
| 6,453,334 B1 | 9/2002 | Vinson et al. |
| 6,453,356 B1 | 9/2002 | Sheard et al. |
| 6,570,563 B1 | 5/2003 | Honda |
| 6,601,233 B1 | 7/2003 | Underwood |
| 6,792,607 B1 | 9/2004 | Burd et al. |
| 6,918,113 B2 | 7/2005 | Patel et al. |
| 6,938,096 B1 | 8/2005 | Greschler et al. |
| 6,970,459 B1 | 11/2005 | Meier |
| 6,976,077 B1 | 12/2005 | Lehew et al. |
| 7,065,568 B2 | 6/2006 | Bracewell et al. |
| 7,069,227 B1 | 6/2006 | Lintel, III et al. |
| 7,073,059 B2 | 7/2006 | Worely et al. |
| 7,149,761 B2 | 12/2006 | Cooke et al. |
| 7,167,893 B1 | 1/2007 | Malone et al. |
| 7,174,504 B2 | 2/2007 | Tsao |
| 7,181,686 B1 | 2/2007 | Bahrs |
| 7,193,985 B1 | 3/2007 | Lewis et al. |
| 7,240,162 B2 | 7/2007 | de Vries |
| 7,246,063 B2 | 7/2007 | James et al. |
| 7,320,131 B1 | 1/2008 | O'Toole, Jr. |
| 7,343,310 B1 | 3/2008 | Stender |
| 7,350,151 B1 | 3/2008 | Nakajima |
| 7,418,711 B1 | 8/2008 | Lee et al. |
| 7,451,196 B1 | 11/2008 | de Vries et al. |
| 7,577,751 B2 | 8/2009 | Vinson et al. |
| 7,620,901 B2 | 11/2009 | Carpenter et al. |
| 7,647,370 B1 | 1/2010 | Liu et al. |
| 7,650,444 B2 | 1/2010 | Dirstine et al. |
| 7,656,799 B2 | 2/2010 | Samuels et al. |
| 7,703,024 B2 | 4/2010 | Kautzleben et al. |
| 7,706,399 B2 | 4/2010 | Janczak |
| 7,725,331 B2 | 5/2010 | Schurenberg et al. |
| 7,802,183 B1 | 9/2010 | Essin |
| 7,831,919 B1 | 11/2010 | Viljoen et al. |
| 7,921,078 B2 | 4/2011 | McCuller |
| 7,941,488 B2 | 5/2011 | Goodman et al. |
| 7,966,572 B2 | 6/2011 | Matthews et al. |
| 8,024,523 B2 | 9/2011 | de Vries et al. |
| 8,261,345 B2 | 9/2012 | Hitomi et al. |
| 8,356,252 B2 | 1/2013 | Raman et al. |
| 8,359,591 B2 | 1/2013 | de Vries et al. |
| 8,509,230 B2 | 8/2013 | Vinson et al. |
| 8,527,706 B2 | 9/2013 | de Vries et al. |
| 8,533,103 B1 | 9/2013 | Certain et al. |
| 8,572,178 B1 | 10/2013 | Frazzini et al. |
| 8,606,952 B2 | 12/2013 | Pasetto et al. |
| 8,607,158 B2 | 12/2013 | Molander et al. |
| 8,627,081 B2 | 1/2014 | Grimen et al. |
| 8,667,054 B2 | 3/2014 | Tahan |
| 8,832,260 B2 | 9/2014 | Raja et al. |
| 8,910,112 B2 | 12/2014 | Li et al. |
| 8,924,512 B2 | 12/2014 | Stoyanov et al. |
| 9,239,812 B1 | 1/2016 | Berlin |
| 9,686,205 B2 | 6/2017 | Leitch et al. |
| 2001/0033299 A1 | 10/2001 | Callaway et al. |
| 2001/0047393 A1 | 11/2001 | Arner et al. |
| 2002/0032751 A1 | 3/2002 | Bharadwaj |
| 2002/0032783 A1 | 3/2002 | Tuatini |
| 2002/0032804 A1 | 3/2002 | Hunt |
| 2002/0092029 A1 | 7/2002 | Smith |
| 2003/0014735 A1 | 1/2003 | Achlioptas et al. |
| 2003/0023670 A1 | 1/2003 | Walrath |
| 2003/0055893 A1 | 3/2003 | Sato et al. |
| 2003/0065738 A1 | 4/2003 | Yang et al. |
| 2003/0120324 A1 | 6/2003 | Osborn et al. |
| 2003/0120762 A1 | 6/2003 | Yepishin et al. |
| 2003/0149941 A1 | 8/2003 | Tsao |
| 2003/0163514 A1 | 8/2003 | Waldschmidt |
| 2003/0184584 A1 | 10/2003 | Vachuska et al. |
| 2003/0208472 A1 | 11/2003 | Pham |
| 2004/0015842 A1 | 1/2004 | Nanivadekar et al. |
| 2004/0029638 A1 | 2/2004 | Hytcheson et al. |
| 2004/0039742 A1 | 2/2004 | Barsness et al. |
| 2004/0068516 A1 | 4/2004 | Lee et al. |
| 2004/0106916 A1 | 6/2004 | Quaid et al. |
| 2004/0117804 A1 | 6/2004 | Scahill et al. |
| 2004/0153525 A1 | 8/2004 | Borella |
| 2004/0162876 A1 | 8/2004 | Kohavi |
| 2004/0183827 A1 | 9/2004 | Putterman et al. |
| 2004/0236633 A1 | 11/2004 | Knauerhase et al. |
| 2004/0243919 A1 | 12/2004 | Muresan et al. |
| 2004/0249885 A1 | 12/2004 | Petropoulakis et al. |
| 2005/0005024 A1 | 1/2005 | Samuels et al. |
| 2005/0010871 A1 | 1/2005 | Ruthfield et al. |
| 2005/0021687 A1 | 1/2005 | Anastassopoulos et al. |
| 2005/0050229 A1 | 3/2005 | Comeau et al. |
| 2005/0138631 A1 | 6/2005 | Bellotti et al. |
| 2005/0188046 A1 | 8/2005 | Hickman et al. |
| 2005/0188313 A1 | 8/2005 | Matthews et al. |
| 2005/0190203 A1 | 9/2005 | Gery et al. |
| 2005/0198578 A1 | 9/2005 | Agrawala et al. |
| 2005/0216421 A1 | 9/2005 | Barry et al. |
| 2005/0240906 A1 | 10/2005 | Kinderknecht et al. |
| 2006/0004874 A1 | 1/2006 | Hutcheson et al. |
| 2006/0026006 A1 | 2/2006 | Hindle |
| 2006/0031377 A1 | 2/2006 | Ng et al. |
| 2006/0031481 A1 | 2/2006 | Patrick et al. |
| 2006/0036770 A1 | 2/2006 | Hosn et al. |
| 2006/0085835 A1 | 4/2006 | Istvan et al. |
| 2006/0101397 A1 | 5/2006 | Mercer et al. |
| 2006/0130069 A1 | 6/2006 | Srinivasan et al. |
| 2006/0231175 A1 | 10/2006 | Vondracek et al. |
| 2006/0236328 A1 | 10/2006 | DeWitt |
| 2006/0258462 A1 | 11/2006 | Cheng et al. |
| 2006/0265689 A1 | 11/2006 | Kuznetsov et al. |
| 2006/0271563 A1 | 11/2006 | Angelo et al. |
| 2006/0288171 A1 | 12/2006 | Tsien |
| 2006/0294418 A1 | 12/2006 | Fuchs |
| 2007/0024645 A1 | 2/2007 | Purcell et al. |
| 2007/0047535 A1 | 3/2007 | Varma |
| 2007/0067754 A1 | 3/2007 | Chen et al. |
| 2007/0079244 A1 | 4/2007 | Brugiolo |
| 2007/0112880 A1 | 5/2007 | Yang et al. |

(56) References Cited

U.S. PATENT DOCUMENTS

| | | |
|---|---|---|
| 2007/0120763 A1 | 5/2007 | De Paepe et al. |
| 2007/0130292 A1 | 6/2007 | Tzruya et al. |
| 2007/0136677 A1 | 6/2007 | Agarwal |
| 2007/0203944 A1 | 8/2007 | Batra et al. |
| 2007/0203999 A1 | 8/2007 | Townsley et al. |
| 2007/0208718 A1 | 9/2007 | Javid et al. |
| 2007/0226636 A1 | 9/2007 | Carpenter et al. |
| 2007/0233706 A1 | 10/2007 | Farber et al. |
| 2007/0244990 A1 | 10/2007 | Wells |
| 2007/0256073 A1 | 11/2007 | Truong et al. |
| 2007/0282951 A1 | 12/2007 | Selimis et al. |
| 2008/0016155 A1 | 1/2008 | Khalatian |
| 2008/0134211 A1 | 6/2008 | Cui |
| 2008/0146194 A1 | 6/2008 | Yang et al. |
| 2008/0159175 A1 | 7/2008 | Flack |
| 2008/0183190 A1 | 7/2008 | Adcox et al. |
| 2008/0313282 A1 | 12/2008 | Warila et al. |
| 2009/0080523 A1 | 3/2009 | McDowell |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2009/0044171 A1 | 12/2009 | Avadhanula |
| 2009/0328032 A1 | 12/2009 | Crow et al. |
| 2010/0061238 A1 | 3/2010 | Godbole et al. |
| 2010/0077058 A1 | 3/2010 | Messer |
| 2010/0131591 A1 | 5/2010 | Thomas et al. |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0223661 A1 | 9/2010 | Yang |
| 2010/0268762 A1 | 10/2010 | Pahlavan et al. |
| 2010/0268813 A1 | 10/2010 | Pahlavan et al. |
| 2011/0138283 A1 | 6/2011 | Marston |
| 2011/0145863 A1 | 6/2011 | Alsina et al. |
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0223882 A1 | 9/2011 | Hellgren |
| 2011/0246891 A1 | 10/2011 | Schubert et al. |
| 2011/0252152 A1 | 10/2011 | Sherry et al. |
| 2011/0314093 A1 | 12/2011 | Sheu et al. |
| 2012/0030275 A1 | 2/2012 | Boller et al. |
| 2012/0084713 A1 | 4/2012 | Desai et al. |
| 2012/0090004 A1 | 4/2012 | Jeong |
| 2012/0133675 A1 | 5/2012 | McDowell |
| 2012/0151373 A1 | 6/2012 | Kominac et al. |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1 | 9/2012 | Lemire et al. |
| 2012/0296959 A1 | 11/2012 | Momchilov et al. |
| 2012/0324032 A1 | 12/2012 | Chan |
| 2012/0324358 A1 | 12/2012 | Jooste |
| 2013/0007227 A1 | 1/2013 | Hitomi et al. |
| 2013/0013671 A1 | 1/2013 | Relan et al. |
| 2013/0031618 A1 | 1/2013 | Momchilov |
| 2013/0046815 A1 | 2/2013 | Thomas et al. |
| 2013/0046816 A1 | 2/2013 | Thomas et al. |
| 2013/0054679 A1 | 2/2013 | Jooste |
| 2013/0070740 A1 | 3/2013 | Yovin |
| 2013/0086156 A1* | 4/2013 | McFadzean ......... H04L 67/148 709/203 |
| 2013/0086652 A1 | 4/2013 | Kavantzas et al. |
| 2013/0113833 A1 | 5/2013 | Larsson |
| 2013/0117474 A1 | 5/2013 | Ajanovic et al. |
| 2013/0132485 A1* | 5/2013 | Thomas ............. H04L 12/1822 709/205 |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0212483 A1 | 8/2013 | Brakensiek et al. |
| 2013/0262566 A1 | 10/2013 | Stephure et al. |
| 2013/0290408 A1 | 10/2013 | Stephure et al. |
| 2013/0290856 A1 | 10/2013 | Beveridge et al. |
| 2013/0346482 A1 | 12/2013 | Holmes |
| 2014/0136667 A1 | 5/2014 | Gonsalves et al. |
| 2014/0214925 A1 | 7/2014 | Thomas et al. |
| 2014/0240524 A1 | 8/2014 | Julia et al. |
| 2014/0241229 A1 | 8/2014 | Bertorelle et al. |
| 2014/0298420 A1 | 10/2014 | Barton et al. |
| 2015/0026338 A1 | 1/2015 | Lehmann et al. |
| 2015/0067035 A1 | 3/2015 | Sullad et al. |
| 2015/0067769 A1 | 3/2015 | Barton et al. |
| 2015/0081764 A1 | 3/2015 | Zhao et al. |
| 2015/0156133 A1 | 6/2015 | Leitch et al. |
| 2015/0163292 A1 | 6/2015 | Lemire et al. |
| 2015/0319252 A1 | 11/2015 | Momchilov et al. |
| 2016/0226979 A1 | 8/2016 | Lancaster et al. |

FOREIGN PATENT DOCUMENTS

| | | |
|---|---|---|
| CN | 102129632 | 7/2011 |
| CN | 102821413 | 12/2012 |
| EP | 0349463 | 1/1990 |
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005-521946 | 7/2005 |
| JP | 2008-099055 | 4/2008 |
| JP | 4405812 | 1/2010 |
| JP | 2010-238126 | 10/2010 |
| JP | 2010-256972 | 11/2010 |
| RU | 2295752 | 3/2007 |
| RU | 2298287 | 4/2007 |
| RU | 2305860 | 9/2007 |
| WO | 1998/058478 | 12/1998 |
| WO | 2001/016724 | 3/2001 |
| WO | 2002/009106 | 1/2002 |
| WO | 2003/032569 | 4/2003 |
| WO | 2003/083684 | 10/2003 |
| WO | 2010/060206 | 6/2010 |
| WO | 2010/088768 | 8/2010 |
| WO | 2010/127327 | 11/2010 |
| WO | 2011/087545 | 7/2011 |
| WO | 2012/127308 | 9/2012 |
| WO | 2013/024342 | 2/2013 |
| WO | 2013/024343 | 2/2013 |
| WO | 2013/109984 | 7/2013 |
| WO | 2013/128284 | 9/2013 |
| WO | 2013/153439 | 10/2013 |
| WO | 2015/080845 | 6/2015 |

OTHER PUBLICATIONS

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5$^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

(56) References Cited

OTHER PUBLICATIONS

Remote Desktop Services (RDS), Remote App, retrieved on May 4, 2014 from http://en.wikipedia.org/wiki/Remote_Desktop_Services, 9 pages.
Remote Desktop Services (RDS), Windows Desktop Sharing, retrieved on May 4, 2014 from http://en.wikipedia.org/wiki/Remote_Desktop_Services, 9 pages.
European Search Report, dated Sep. 1, 2015, received in connection with European Patent Application No. 12824363.1.
European Search Report, dated Sep. 1, 2015, received in connection with European Patent Application No. 12824077.7.
European Search Report, dated Mar. 3, 2015, received in connection with European Patent Application No. 09828497.9.
European Search Report, dated Jun. 2, 2014, received in connection with European Patent Application No. 12760310.8.
European Search Report, dated Jul. 5, 2012, received in connection with European Patent Application No. 10738183.2.
International Search Report and Written Opinion, dated Mar. 19, 2015, received in connection with International Patent Application No. PCT/US2014/064243.
International Search Report, dated Feb. 19, 2010, received in connection with International Patent Application No. PCT/CA2009/001704.
International Preliminary Report on Patentability and Written Opinion, dated May 31, 2011, received in connection with International Patent Application No. PCT/CA2009/001704.
International Preliminary Report on Patentability and Written Opinion, dated Aug. 9, 2011, received in connection with International Patent Application No. PCT/CA2010/000154.
International Search Report, dated May 12, 2010, received in connection with International Patent Application No. PCT/CA2010/000154.
International Preliminary Report on Patentability and Written Opinion, dated Sep. 24, 2013, received in connection with International Patent Application No. PCT/IB2012/000562.
International Search Report and Written Opinion, dated Jul. 31, 2012, received in connection with International Patent Application No. PCT/IB2012/000562.
International Preliminary Report on Patentability and Written Opinion, dated Feb. 18, 2014, received in connection with International Patent Application No. PCT/IB2012/001589.
International Search Report, dated Dec. 20, 2012, received in connection with International Patent Application No. PCT/IB2012/001589.
International Preliminary Report on Patentability and Written Opinion, dated Feb. 18, 2014, received in connection with International Patent Application No. PCT/IB2012/001590.
International Search Report, dated Dec. 28, 2012, received in connection with International Patent Application No. PCT/IB2012/001590.
International Preliminary Report on Patentability and Written Opinion, dated Oct. 14, 2014, received in connection with International Patent Application No. PCT/IB2013/000676.
International Search Report and Written Opinion, dated Aug. 21, 2013, received in connection with International Patent Application No. PCT/IB2013/000676.
International Preliminary Report on Patentability and Written Opinion, dated Sep. 2, 2014, received in connection with International Patent Application No. PCT/IB2013/000720.
International Search Report and Written Opinion, dated Jul. 31, 2013, received in connection with International Patent Application No. PCT/IB2013/000720.
International Search Report and Written Opinion, dated Jun. 30, 2016, received in connection with International Patent Application No. PCT/IB2016/000277.
"GTK 3, Broadway and an HTML5 websocket gui, for free," retrieved on Sep. 26, 2017 at http://compsci.ca/v3/viewtopic.php?t=36823, Apr. 12, 2014, pp. 1-3.

* cited by examiner

METHOD AND SYSTEM FOR ENABLING INTERACTION WITH A PLURALITY OF APPLICATIONS USING A SINGLE USER INTERFACE

CROSS-REFERENCE TO RELATED APPLICATIONS

This application is a continuation-in-part of U.S. patent application Ser. No. 12/658,080, filed on Feb. 2, 2010, and entitled "METHOD AND SYSTEM FOR ENABLING INTERACTION WITH A PLURALITY OF APPLICATIONS USING A SINGLE USER INTERFACE," which claims the benefit of U.S. provisional patent application No. 61/202,168, filed on Feb. 3, 2009, and entitled "METHOD AND SYSTEM FOR ENABLING INTERACTION WITH A PLURALITY OF APPLICATIONS USING A SINGLE USER INTERFACE," the disclosures of which are expressly incorporated herein by reference in their entireties. This application is also a continuation-in-part of U.S. patent application Ser. No. 13/586,007, filed on Aug. 15, 2012, and entitled "NON-INVASIVE REMOTE ACCESS TO AN APPLICATION PROGRAM," which claims the benefit of U.S. provisional patent application Nos. 61/523,632 and 61/523,644, each filed on Aug. 15, 2011, and each entitled "NON-INVASIVE REMOTE ACCESS TO AN APPLICATION PROGRAM," the disclosures of which are expressly incorporated herein by reference in their entireties.

BACKGROUND

Techniques exist for the virtualization of single applications to allow users to interact with application programs while using a client computer remote to the computer on which the application is executed. Other techniques enable modeling and virtualizing of single applications such that an internal user interface and application state are available to a remote client computer.

Often multiple associated applications are used simultaneously in an overall workflow to accomplish a set of tasks. Currently these applications are launched individually with individual tools for their virtualization.

When a user has to interact simultaneously with two or more applications using a display monitor the applications typically employ display images that share the display area of the monitor. For example, a first application generates a first user interface using a first image window to enable user interaction with the first application. When launching a second application a second user interface using a second image window is generated to enable user interaction with the second application. The second image window is placed in the foreground overlaying the first image window when in response to user interaction with the second application. Thus the first image window is at least partially obscured. When the user then interacts with the first application the situation is vice versa. This is a non-user friendly process substantially impeding demanding user interaction such as viewing and diagnosing medical images.

It would be desirable to enable simultaneous user interaction with a plurality of application programs using a single user interface.

SUMMARY

In accordance with embodiments of the present invention there is provided a method simultaneously interacting with a plurality of application programs. Using a processor an application interaction program is executed. The application interaction program has a plurality of application programs associated therewith. Using the processor interactive functionalities of the plurality of application programs are associated with respective interaction zones, wherein an interactive functionality being a same for at least two application programs is associated with a single interaction zone. Using the processor display data indicative of a single user interface comprising the interaction zones are generated. The interaction zones enable user interaction with the plurality of application programs. Using a graphical display connected to the processor the display data are displayed in a human comprehensible fashion.

In accordance with embodiments of the present invention there is provided a storage medium having stored therein executable commands for execution on a processor of a computer system, the processor when executing the commands executes an application interaction program. The application interaction program has a plurality of application programs associated therewith. The processor associates interactive functionalities of the plurality of application programs with respective interaction zones, wherein an interactive functionality being a same for at least two application programs is associated with a single interaction zone. The processor generates display data indicative of a single user interface comprising the interaction zones. The interaction zones enable user interaction with the plurality of application programs and provides the display data to a graphical display connected to the processor for displaying the display data in a human comprehensible fashion.

An example method for recombination of a plurality of application programs is described herein. The method can include providing a remote access framework for enabling a client to remotely access the plurality of application programs over a network, receiving a communication (e.g., requesting access to the plurality of application programs) from the client through the remote access framework, and maintaining a state model within the remote access framework. The plurality of application programs can run on at least one server. Additionally, the state model can include respective application states of the plurality of application programs. The method can also include, using the state model, linking interactive functionalities of the plurality of application programs, and generating display data indicative of a single user interface including the plurality of application programs. The method can further include communicating the display data to the client through the remote access framework.

Optionally and additionally, the method can include receiving user input data from the client through the remote access framework, determining an association of the user input data to a respective interaction zone using the state model, and providing the user input data to at least one of the plurality of application programs associated with the respective interaction zone through the remote access framework. The user input data can optionally be simultaneously provided to the at least two of the plurality of application programs associated with the single interaction zone.

Optionally and additionally, the method can include receiving application program data from the at least one of the plurality of application programs through the remote access framework. The application program data can be dependent upon the user input data. Additionally, the display data can be generated in dependence upon the application program data for displaying the application program data using the single user interface.

Optionally and additionally, the method can include receiving first application program data and second application program data from a first application program and a second application program, respectively, through the remote access framework. Additionally, the display data can be generated in dependence upon the first application program data and the second application program data for displaying the first application program data and the second application program data using the single user interface. Optionally, the display data can be generated for simultaneously displaying the first application program data and the second application program data using the single user interface.

Optionally and additionally, the method can include receiving user input data from the client through the remote access framework, determining an association of the user input data to first application program data associated with a first application program and to second application program data associated with a second application program using the state model, and providing the user input data to the first and second application programs. Additionally, the first and second application program data can be modified according to the user input data.

Optionally and additionally, the association of the user input data to the respective interaction zone can be determined based on a location of the respective interaction zone on a graphical display image of the client. For example, the association of the user input data to the respective interaction zone can be determined in a pixel-wise fashion.

Optionally and additionally, the interactive functionalities can be a subset of a plurality of functionalities of at least one of the plurality of application programs.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for simultaneously interacting with a plurality of application programs using a single user interface (sometimes referred to herein as "recombination"), it will become evident to those skilled in the art that the implementations are not limited thereto.

Figure 1:
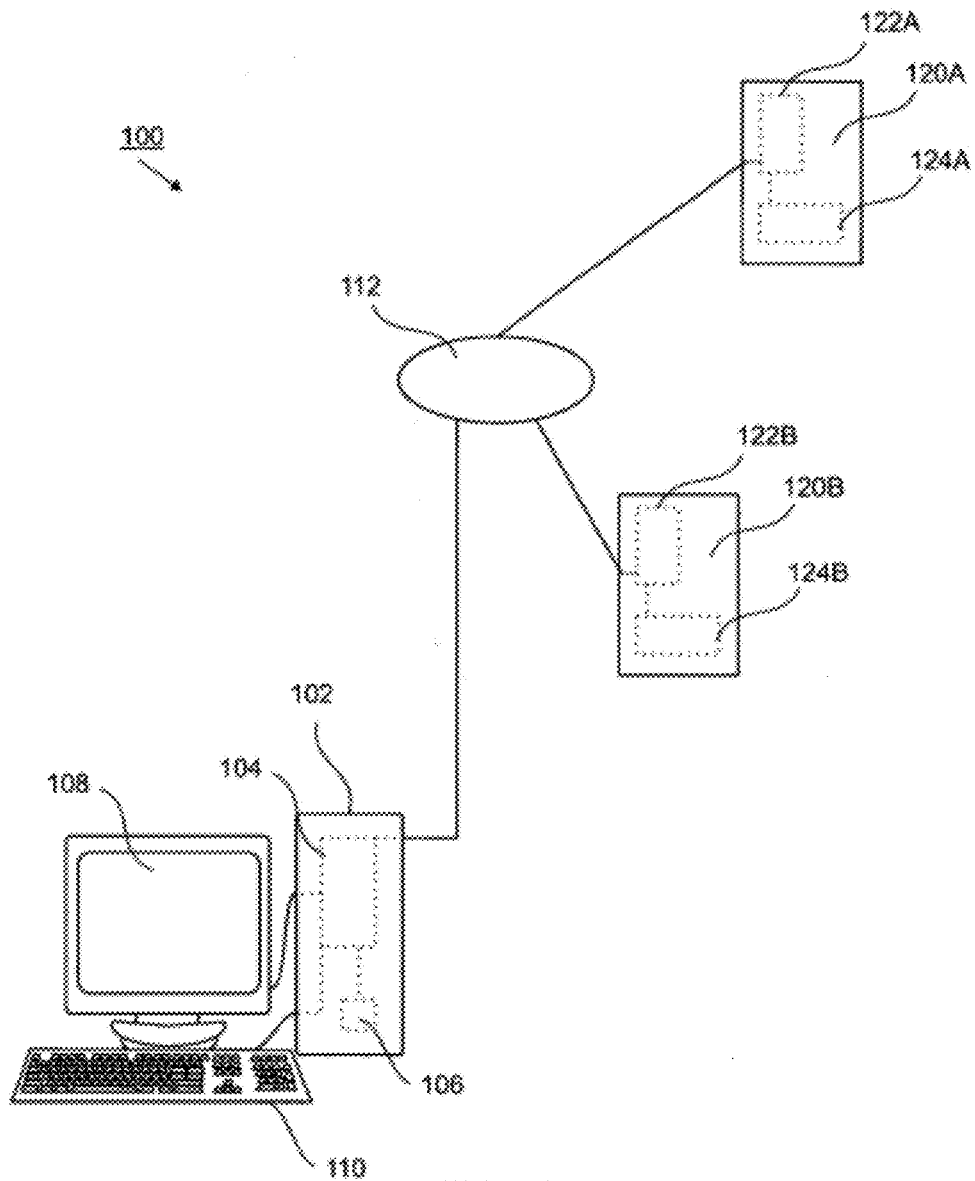
FIG. 1 is a simplified block diagram of a system for implementing a method for simultaneously interacting with a plurality of application programs according to implementations described herein.

Referring to FIG. 1, an example 100 of a system for implementing a method for simultaneously interacting with a plurality of application programs according to implementations described herein below is shown. The system 100 comprises a client computer 102 such as, for example, a personal computer, workstation, laptop computer, tablet computer, or smart phone. Optionally, the client computer 102 can be used for accessing one or more application programs (e.g., remote application programs) such as applications for viewing medical images of a patient and for entering a diagnostic report into a respective patient application file. Optionally, the client computer 102 can be used for accessing application programs for viewing three-dimensional (3D) and two-dimensional (2D) computer-aided designs (CAD) images. It should be understood that these application programs are provided only as examples and that the client computer 102 can be used for accessing other types of application programs. The client computer 102 is connected via a communication network 112 to server computers 120A and 120B. The server computers 120A and 120B are, for example, running different application programs 124A and 124B. The application programs 124A and 124B can be stored in memory, for example. Optionally, the server computers 120A and 120B can be running different application programs for performing, for example, different image rendering processes of image data captured by different imaging systems such as MRI and CT scanners, and application programs for managing patient files such as, for example, application programs implemented in a PACS system. Optionally, the server computers 120A and 120B can be running different application programs for performing, for example, different image rendering processes of 2D CAD images and 3D CAD images, respectively. It should be understood that these application programs are provided only as examples and that the server computers 120A and 120 be can be used for running other types of application programs. Alternatively, in some implementations, one of the server computers (i.e., server computer 120A or server computer 120B) can run different application programs. The communication network 112 comprises, for example, a Local Area Network (LAN) connecting the client computer 102 with the server computers 120A and 120B within an organization such as, for example, a hospital. Alternatively, the communication network 112 comprises a Wide Area Network (WAN) or the Internet connecting client computers and server computers of various organizations such as, for example, hospitals, diagnostic clinics, and family physician's offices. It should be understood that the networks connecting client computers with server computers of medical organizations are provided only as examples and that the networks for connecting client computers with server computers of other organizations including, but not limited to, public and/or private companies, governments, educational institutions, or combinations thereof, can be implemented.

The implementations of the method for recombination of and/or simultaneously interacting with a plurality of application programs described herein are performed, for example, by executing executable commands stored in memory 106 of the client computer 102 using processor 104. An application interaction program is then executed in dependence upon user requests. For example, the application interaction program provides commands to processors 122A and 122B of the server computers 120A and 120B to execute a first application program and a second application program, respectively. During execution the application interaction program enables simultaneous user interaction with both application programs while providing a single user interface which is displayed on graphical display 108 of the client computer 102. Alternatively, one or more application programs are executed using the processor 104 of the client computer 102. As described below, client and server remote access program(s) of FIG. 4 and a state model of FIG. 5 can be used to facilitate recombination of and/or simultaneous interaction with the plurality of application programs. The processor 104 for executing the application interaction program is, for example, a Central Processing Unit (CPU) of the client computer 102. Optionally, a Graphics Processing Unit (GPU) is employed executing at least a portion of the application interaction program, for example, for generating display data. The client computer 102 can also include input device(s) such as a keyboard 110. It should be understood that the client computer 102 can include other types of input devices including, but not limited to, a mouse, touch screen, or other device for receiving user input data.

While implementations will be described for recombination of and/or simultaneously interacting with a plurality of application programs using a single user interface in a medical application for the sake of simplicity, it will become evident to those skilled in the art that the implementations are not limited thereto, but are applicable in numerous other fields where simultaneous interaction with a plurality of application programs using a single user interface is desired.

Figure 2A:
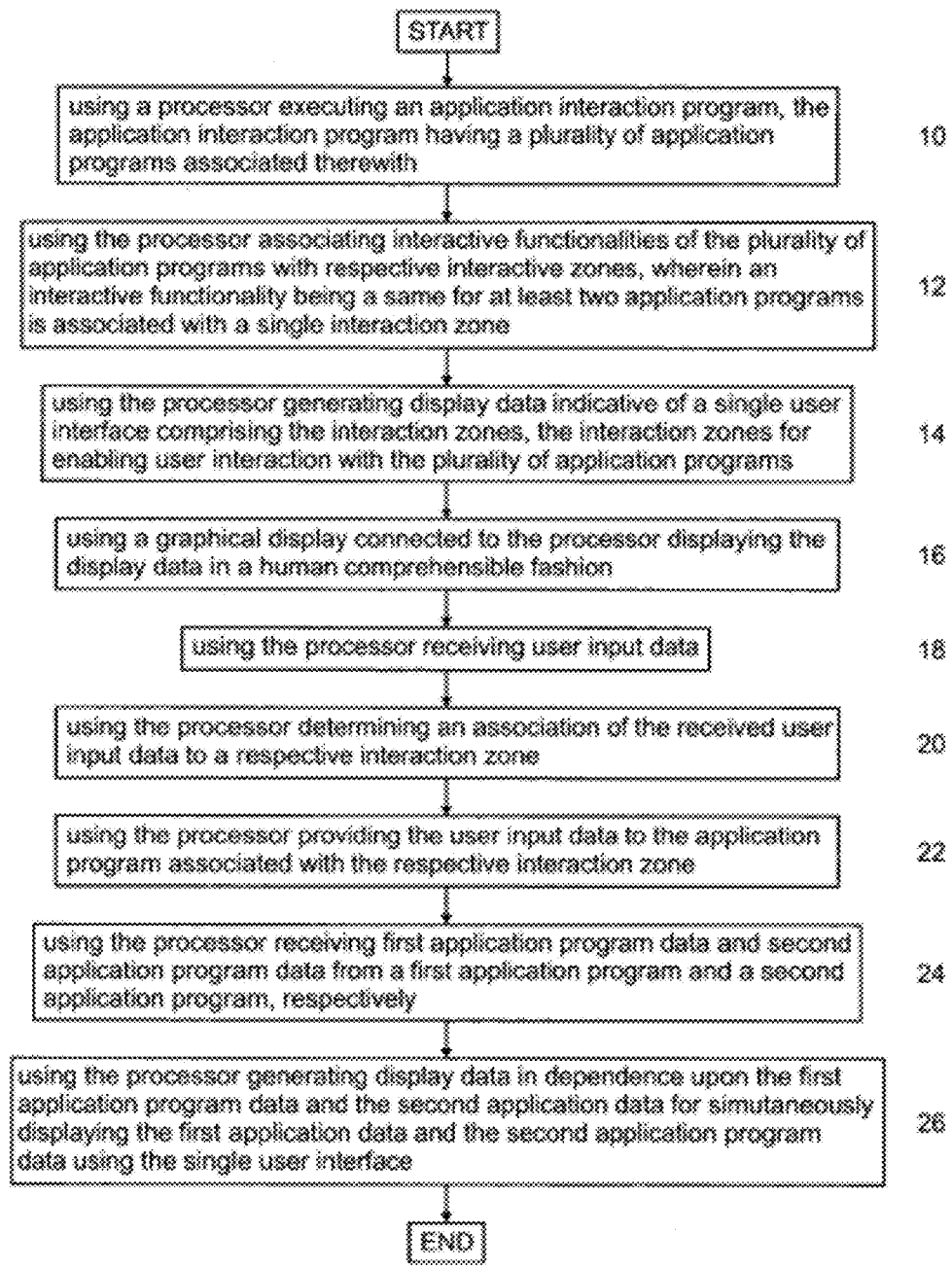
FIG. 2A is a simplified flow diagram of the method for simultaneously interacting with a plurality of application programs according to implementations described herein.

Referring to FIG. 2A, an example implementation of a method for simultaneously interacting with a plurality of application programs is provided. At 10, the application interaction program having a plurality of application programs associated therewith is executed. The plurality of application programs is, for example, user selected with a user being presented with a selection menu comprising a plurality of buttons—each button associated with an application program. Alternatively, the plurality of application programs is already associated with the application interaction program, for example, application programs needed for performing a specific task by the user. Optionally and additionally, each of the plurality of application programs can be remotely accessed application programs (e.g., application programs 124A and 124B running on server computers 120A and 120B). At 12, interactive functionalities of the plurality of application programs are associated with respective interaction zones. An interactive functionality that is the same for at least two application programs is associated with a single interaction zone. The interactive functionalities of the plurality of application programs are, for example, simultaneously associated with respective interaction zones after the plurality of application programs has been selected. Alternatively, the interactive functionalities of the plurality of application programs are associated with respective interaction zones separately for each of the plurality of application programs. For example, after the user has selected a first application program the interactive functionalities of the first application program are associated with respective interaction zones and after the user has selected a second application program the interactive functionalities of the second application program are associated with respective interaction zones. If a functionality is in common with the first application program it is associated with the respective interaction zone of the first application program. Here a user is enabled to select an additional application program at a later time. Optionally, interactive functionalities of the plurality of application programs can be associated with respective interaction zones using the client and server remote access application(s) and/or state model, for example, as described below with respect to FIGS. 4 and 5.

The associated interactive functionalities are, for example, a subset of the functionalities of an application program. For example, the user is presented with a menu for selecting the subset of the functionalities enabling the user to select functions, for example, related to viewing but to omit functions related to editing, thus avoiding clutter on the screen. Further optionally, the user is enabled to select additional functionalities during execution of the application program if a need arises. Alternatively, the subset of functionalities is predetermined, for example, depending on the task the user is going to use the plurality of application programs for or access limitations of the user.

At 14, display data indicative of a single user interface comprising the interaction zones are generated. The interaction zones enable the user to interact with the plurality of application programs. The display data are then displayed—16—in a human comprehensible fashion using the graphical display 108 connected to the processor 104. Optionally, display data (e.g., a single user interface including respective display areas for different application programs) can be generated using the client and server remote access application(s) and/or state model, for example, as described below with respect to FIGS. 4 and 5.

Figure 3:
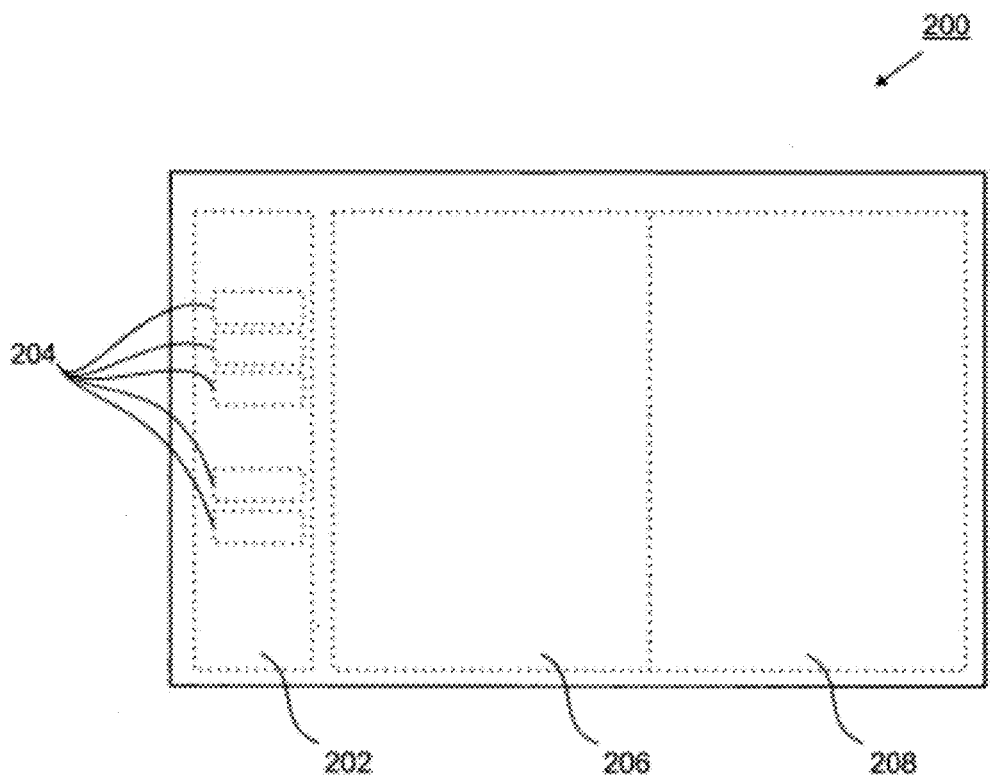
FIG. 3 is a simplified block diagram illustrating a single navigable window for use with the method for simultaneously interacting with a plurality of application programs according to implementations described herein.

Referring to FIG. 3, an example outlay of a single user interface 200 is illustrated, but the implementations are not limited thereto. The single user interface 200 is presented as a single navigable window which comprises a command field 202 with a plurality of interaction zones 204—for example, in the form of buttons—and display areas 206 and 208. The interaction zones 204 are, for example, clicked on by a mouse click, using keyboard 110 commands, or touched using a touch screen. The display areas are for displaying, for example, imaging data provided by a first application program—206—and a second application program—208. The interaction zones 204 are grouped, for example, according to the functionality they are associated with—for example, one group related to commands used for viewing and another group related to commands used for editing— and/or the respective application program. Optionally, the interaction zones 204 when clicked on open a scroll down menu for selection of specific functions or open a field for receiving user information, for example, a patient's name typed by the user.

At 18, user input data are received, i.e. user has clicked on an interaction zone 204. An association of the received user input data to the respective interaction zone is then determined—20—and provided to the application program associated with the respective interaction zone—22. Optionally, user input data can be associated with the respective interaction zone and provided to the application program(s) using the client and server remote access application(s) and/or state model, for example, as described below with respect to FIGS. 4 and 5. If an interaction zone is associated with a functionality shared by at least two application programs the user input data are simultaneously provided to the at least two application programs associated with the single interaction zone. For example, the user is then enabled while viewing two sets of image data provided by two application programs—for example, a first application program for viewing CT scans and a second application program for viewing MRI data—which are simultaneously displayed in the display areas 206 and 208 to simultaneously move up and down in both images. Optionally, the user is enabled and to select one application program for provision of the user input data thereto.

At 24, first application program data and second application program data are received from a first application program and a second application program, respectively, and display data are generated—26—in dependence upon the first application program data and the second application program data which are then simultaneously displayed in the display areas 206 and 208 of the single user interface 200. Optionally, the display data in dependence upon the first and second application program data can be generated using the client and server remote access application(s) and/or state model, for example, as described below with respect to FIGS. 4 and 5.

The implementations described herein enable simultaneous interaction with a plurality of application programs—including programs utilizing Graphic Processing Units (GPU)—in the overall workflow to accomplish a set of tasks using a single user interface. The simultaneous interaction is realized by monitoring events such as, for example, key strokes or mouse clicks with respect to the location of the event—the respective interaction zone—on the graphical display image. The received user input data are associated to a respective interaction zone—which is associated to a functionality of an application program—based on the location of the interaction zone in the graphical display image. The location is determined, for example, in a pixel-wise fashion, i.e. is based on a pixel by pixel understanding of the user interface. The application interaction program is implemented using standard programming languages, for example, programming languages based on PUREWEB technology of CALGARY SCIENTIFIC of Calgary, AB, Canada.

Further optionally, the user is enabled to request linking of application programs using the single user interface in order to directly link the operation of the first application program to the operation of the second application program. For example, the operation of the second application program depends on a result produced by the first application program or during operation of the second application program data produced by the first application program are used.

Figure 4:
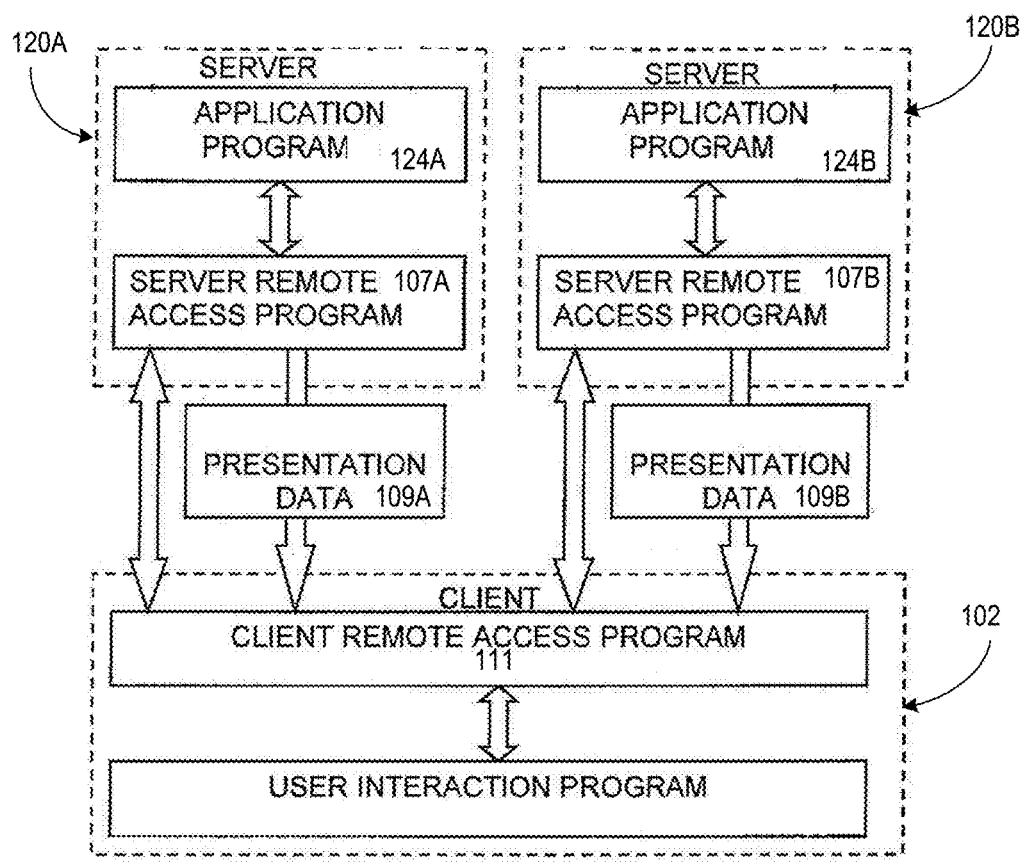
FIG. 4 is a simplified block diagram illustrating operation of server and client remote access program(s) according to implementations described herein.

Referring now to FIG. 4, a simplified block diagram illustrating operation of server and client remote access program(s) are described, which can be used to facilitate remote access to application programs. For example, as described above, client computer 102 can remotely access and simultaneously interact with application programs 124A and 124B, which are different application programs running on server computers 120A and 120B, respectively. Alternatively, client computer 102 can remotely access different application programs running on one of server computer 120A or server computer 120B.

To provide remote access to the application programs 124A and 124B, communication is established between, e.g., the client computer 102 and the server computers 120A and 120B at respective enumerated URLs associated with each of application programs 120A and 120B. In particular, the communication is enabled by a server remote access program 107A of server computer 120A, a server remote access program 107B of server computer 120B, and a client remote access program 111 of client computer 102, as shown in FIG. 4. The server remote access programs 107A and 107B can be stored in respective memories of server computers 120A and 120B and executed by processors 122A and 122B, respectively. Additionally, the client remote access program 111 can be stored in memory 106 and executed by processor 104. The communication may be over any type of network, as noted above.

During remote communication sessions with the client computer 102, the server remote application programs 107A and 107B receive application data from application programs 124A and 124B, respectively. Upon receipt, the server remote application programs 107A and 107B generate presentation data 109A and 109B (e.g., in accordance with a state model described with regard to FIG. 5), respectively, and transmits the same to the client remote access program 111.

Optionally or additionally, the display of the application programs 124A and 124B can be presented through a process called recombination, which can be based on information contained in the state model of FIG. 5, described below. As will be described in greater detail, the state model includes an association of logical elements of the application programs with corresponding states of the application programs. With recombination, the logical elements in the state model associated with each of the application programs 124A and 124B are seamlessly integrated into the same user interface (e.g., a single user interface) of client computer 102 such that views of both application programs 124A and 124B can be presented simultaneously. For example, as described above, a single user interface including respective display areas for different application programs can be provided. Optionally or additionally, functionalities and controls associated with the application programs 124A and 124B can be combined within the same user interface (e.g., a single user interface). For example, as described above, a plurality of interaction zones, which correspond to functionalities of a plurality of application programs, can be provided. In some implementations, a single interaction zone is associated with the same functionality of a plurality of application programs. For example, a plurality of image viewing application programs (e.g., application programs for viewing MRI and CT images or application programs for viewing 2D CAD and 3D CAD images) can share a common interaction zone (e.g., an arrow button). When a user selects this common interaction zone (e.g., the arrow button), the respective images of the application programs are manipulated (e.g., pan, scroll, zoom, etc.) simultaneously. This disclosure contemplates that recombination also optionally provides the ability to identify and coordinate common data shared by a plurality of application programs. In other words, by understanding the functionality of the application programs, it is possible to identify and synchronize underlying common data used by the application programs. For example, a plurality of application programs such as an application program for viewing a patient's medical images and a billing application program, respectively, can share common data (e.g., biographic data such as the patient's name). Each application can maintain the common data independently of the other application. For example, the image viewing application displays biographic data (e.g., the patient's name) as recorded in the image data file, while the billing application program displays the same biographic data (e.g., the patient's name) as recorded in a billing database. Recombination can be used to ensure that when a change is made to an instance of the common data in one application program, an event can be automatically generated (e.g., using the state model described herein) to cause the same change to be made to instance(s) of the common data in the other application program(s). For example, using recombination, the image viewing application and billing application (both including the biographic data) can be simultaneously displayed in a single user interface. In other words, recombination can be used to display the biographic data for the image viewing application and the billing application in a single user interface. This can be used for quality assurance (QA) applications, e.g., to ensure that the biographic data is correctly stored in both the image viewing application and the billing application. Additionally, in the event the patient's name is changed in one of the applications (e.g., in the billing application, "J Smith" is changed to "John P. Smith"), an event can be automatically generated that causes the same change to occur in the other application (e.g., on noting the change in the patient's name in the billing application, and using the state model, an "update patient name" event is generated with "John P. Smith" as the new information in the image viewing application). It should be understood that this saves effort and ensures data synchronization between the application programs. Optionally, a user can be prompted to confirm the change in the other application.

Figure 5:
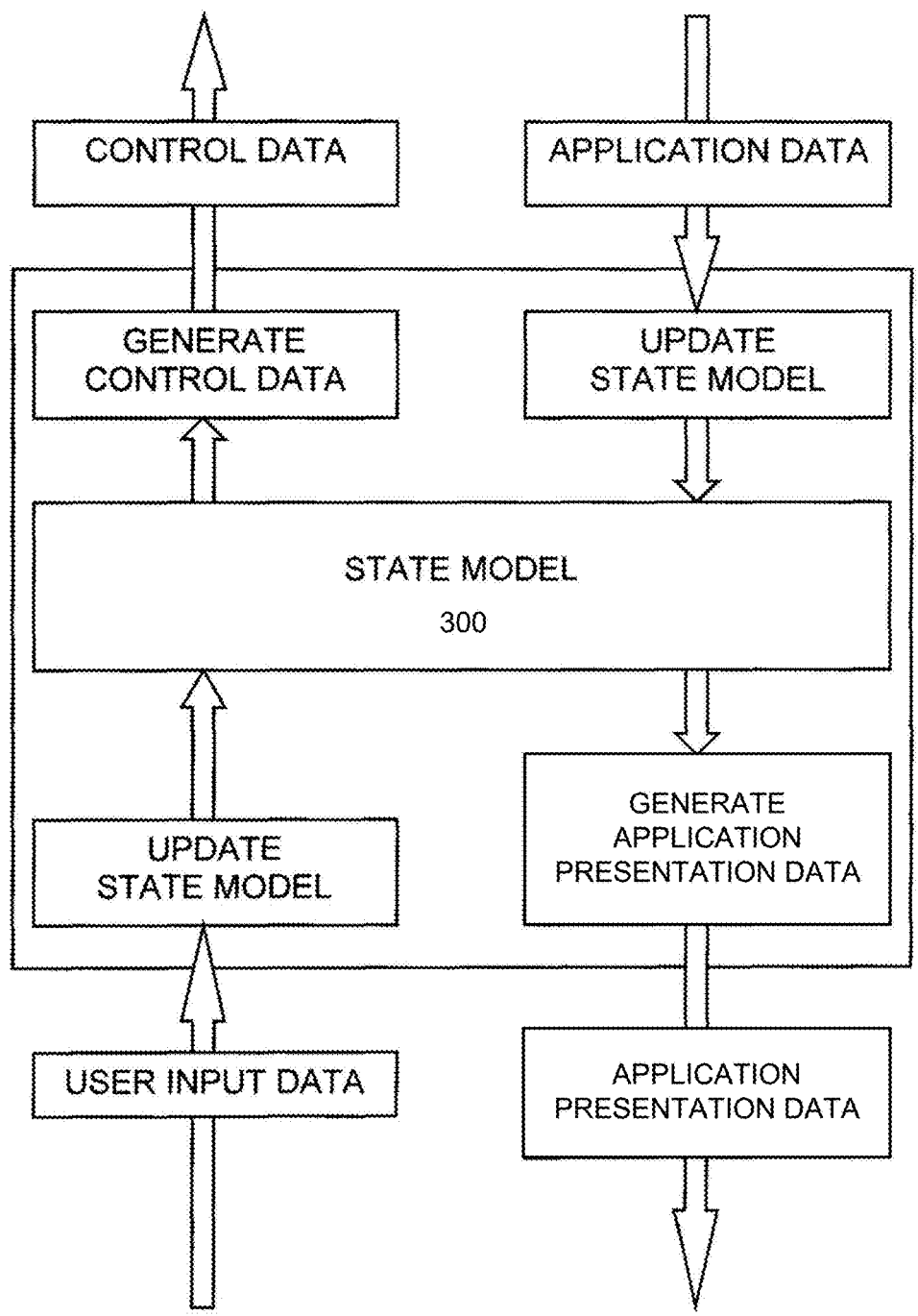
FIG. 5 illustrates a state model according to implementations described herein.

In some implementations, the operation of the remote access program (server and client) is performed in cooperation with a state model 300, as illustrated in FIG. 5. When executed, the client remote access program updates the state model 300 in accordance with user input data received from a user interface program. As described above, the user input data can include a user's selection of an interaction zone, which can be associated with an interactive functionality of one or more application programs. Alternatively or additionally, the user input can include a user's entry of, or modification to, application data. The remote access program may generate control data in accordance with the updated state model, and provide the same to the application programs 124A and 124B running on the server computers 120A and 120B. The application programs 124A and 124B may be any application running on the server computers 120A and 120B with which an end user interacts using the client computer 102.

As described above, upon receipt of application data from the respective application programs, the server remote access programs update the state model 300 in accordance with the screen or application data, generate presentation data in accordance with the updated state model, and provide the same to the user interface program on the client computer 102. The state model 300 comprises an association of logical elements of the application programs with corresponding states of the application programs, with the logical elements being in a hierarchical order. In some implementations, the state model 300 may represent the logical elements within an eXtensible Markup Language (XML) document. For example, the logical elements may be a screen, a menu, a submenu, a button, etc. that make up the application programs user interfaces. This enables the client computer 102, for example, to natively display the logical elements. As such, a menu of the application program 124A and/or 124B that is presented on a mobile phone will look like a native menu of the mobile phone. Similarly, the menu of the application program 124A and/or 124B that is presented on desktop computer will look like a native menu of the desktop computer operating system. In accordance with aspects of the present disclosure, the screen image may be communicated as a single logical element in a separate channel to the client. The screen image may be referenced in the state model to enable the client remote access program to retrieve the screen image from the separate channel and display it on the client. As such, the screen will have a substantially similar appearance on different client computers, although it may be scaled according to the characteristics of each device.

The state model 300 is determined such that each of the logical elements is associated with a corresponding state of the application program. The state model 300 may be determined such that the logical elements are associated with user interactions. For example, the logical elements of the application program are determined such that the logical elements comprise transition elements with each transition element relating a change of the state model 300 to one of control data and application representation data associated therewith.

In some implementations, the state information may include a reference or references to one or more rectangular regions that comprise the screen image generated by the application program. A control may be provided by the client remote access program to enable a user to select among the one or more rectangular regions for display at the client device. In some implementations, the control may provide a selection among one or more rectangular regions of screen image data created by plural application programs (e.g., application programs 124A and 124B) for selection by a user.

In some implementations, the state information may include information about a state of a display of the client computer 102. For example, display resolution may be maintained in the state model 300, which may be used as part of the refactoring of the presentation data in accordance with the client computing device's capabilities. The state model may also include information that may be used for recombination purposes.

Figure 2B:
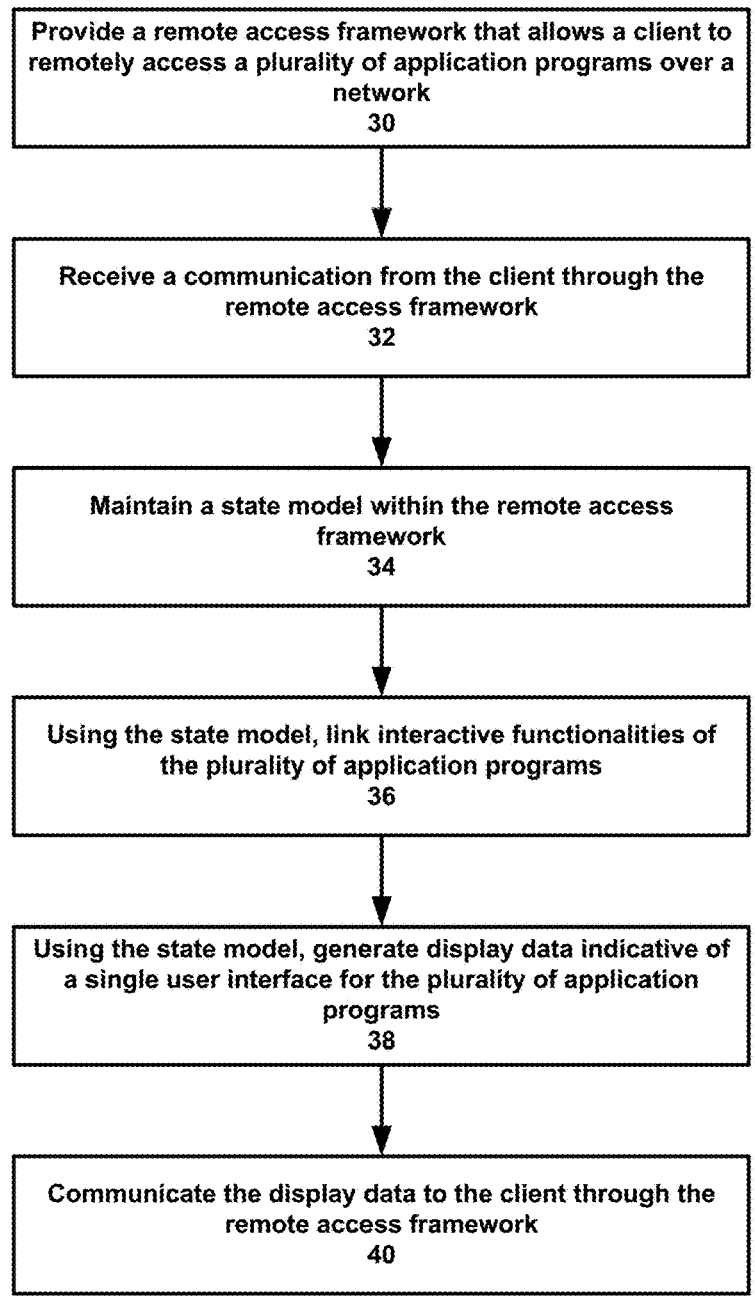
FIG. 2B is another simplified flow diagram of the method for recombination of a plurality of application programs according to implementations described herein.

Referring to FIG. 2B, an example implementation of a method for recombination of a plurality of application programs is provided. At 30, a remote access framework is provided. The remote access framework can allow a client (e.g., client computer 102) to remotely access the plurality of application programs (e.g., application programs 124A and 124B running on at least one server such as server computer 120A and/or server computer 120B) over a network (e.g., network 112). For example, the remote access framework can be implemented as described with respect to FIG. 4 (e.g., using client and server remote access application(s)) and FIG. 5 (e.g., using a state model). At 32, a communication from the client is received through the remote access framework. The communication can be a request to access the plurality of application programs. For example, as described above, the client and the server(s) can establish connections at respective URLs associated with each of the plurality of application programs. At 34, a state model can be maintained within the remote access framework. The state model can include respective application states of the plurality of application programs, for example, as described above with regard to FIG. 5.

At 36, using the state model, interactive functionalities of the plurality of application programs can be linked. As described above, the respective interaction zones enable user interaction with the plurality of application programs. For example, for image viewing application programs (e.g., applications for viewing medical images, CAD images, etc.), the interactive functionalities can include a subset of functionalities enabling a user to view images (e.g., pan, scroll, zoom, etc.). The interactive functionalities can optionally be associated with buttons, for example, which can be selected by a user's keystroke, mouse, touch, etc. at the client. In some implementations, a same interactive functionality for at least two application programs can be associated with a single interaction zone. For example, as described above, two (or more) application programs can share the same functionality. By providing a single interaction zone for the shared functionality, user input data can be simultaneously provided to at least two application programs. In some implementations, interactive functionalities for at least two application programs can be linked by linking views and/or application state information of the respective application programs. At 38, display data indicative of a single user interface (e.g., user interface 200) including the plurality of applications can be generated. At 40, the display data can be communicated to the client through the remote access framework. The display data can then be displayed, for example, using a display device of the client (e.g., graphical display 108).

Optionally and additionally, as described above, a user can input data (e.g., user input data) at the client, for example, using a user interface program. This can optionally include selection of an interaction zone, for example by keystroke, mouse, touch, etc. at the client. Using the remote access framework, the client (e.g., using the client remote access program 111) can update the state model (e.g., state model 300) in accordance with the user input data. Using the state model, the interaction zone can be associated with an interactive functionality of at least one application program. Then, using the remote access framework, the server (e.g., using the server remote access program 107A or 107B) can generate control data in accordance with the updated state model and provide the same to the at least one application program. When a single interaction zone is associated with a functionality shared by two or more applications programs, the control data can be simultaneously provided to the two or more application programs. Alternatively or additionally, when views and/or application state are linked, control data can be automatically generated and provided in one application program based on a user input in the other application program.

Optionally and additionally, as described above, the user input data can modify first application program data associated with a first application program and second application program data associated with a second application program. Using the remote access framework, the client (e.g., using the client remote access program 111) can update the state model (e.g., state model 300) in accordance with the user input data. Then, using the state model, the user input data can be associated with the first application program data and the second application program data. For example, the first and second application program data can optionally be data common to two application programs (e.g., patient biographical data). Then, using the remote access framework, the server (e.g., using the server remote access program 107A or 107B) can generate control data in accordance with the updated state model and provide the same to the first and second application programs, which causes the first and second application program data to be modified. Accordingly, common data can be synchronized by two (or more) application programs.

Optionally and additionally, as described above, the user input data can cause the at least one application program to change application states. Using the remote access framework, the server (e.g., using the server remote access program 107A or 107B) can receive application program data from the at least one application program. In other words, the application program data depends on the user input data (e.g., the change of application state caused by the user input data). The server (e.g., using the server remote access program 107A or 107B) can update the state model (e.g., state model 300) in accordance with the application data. Then, the server (e.g., using the server remote access program 107A or 107B) can generate display data (e.g., presentation data 109A and/or 109B) in dependence upon the application program data for displaying the application program data using the single user interface (e.g., user interface 200). As described above, the display data can be communicated to the client through the remote access framework. The display data can then be displayed, for example, using a display device of the client (e.g., graphical display 108). Optionally, as described above, the server (e.g., using the server remote access program 107A or 107B) can receive first and second application program data from first and second application programs, respectively. Optionally, the display data can be generated for simultaneously displaying the first application program data and the second application program data using the single user interface (e.g., in display areas 206 and 208, respectively, of user interface 200).

Examples

The systems and methods described herein enable a plurality of application programs to interoperate together on the server-side such that the application programs can be recombined into a single workflow on the client side. The systems and methods described herein seamlessly integrate logical elements in a state model associated with a plurality of applications programs into a single user interface. The systems and methods described herein enable simultaneous interaction with a plurality of application programs using a single user interface. The systems and methods described herein enable display of a plurality of applications programs in a single user interface. The systems and methods described herein provide the ability to identify and coordinate common data shared by a plurality of application programs. Each of these aspects, alone or in combination with other aspects, of the systems and methods is referred to herein as "application recombination" or "recombination." Recombination allows a plurality of application programs (e.g., applications of a company or enterprise that has grown through merger and acquisition) to interact and be presented with a common user interface client-side. In particular, a logic layer can be created that recombines application logic of the application programs into a new workflow. In some implementations, recombination can be implemented using PUREWEB technology of CALGARY SCIENTIFIC of Calgary, AB, Canada.

Figure 6A:
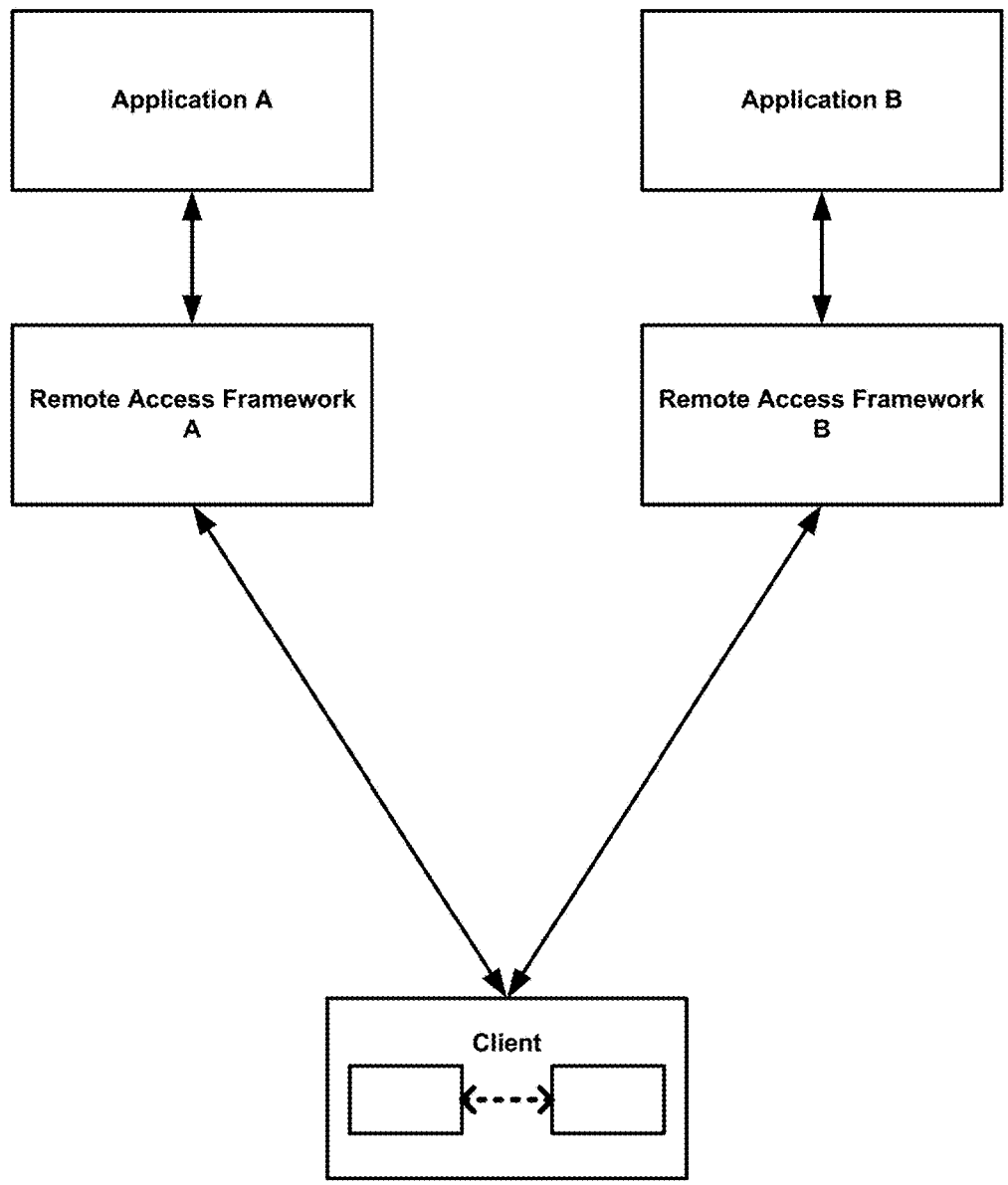
FIG. 6A is a block diagram illustrating recombination of a plurality of application programs according to implementations described herein.
Figure 6B:
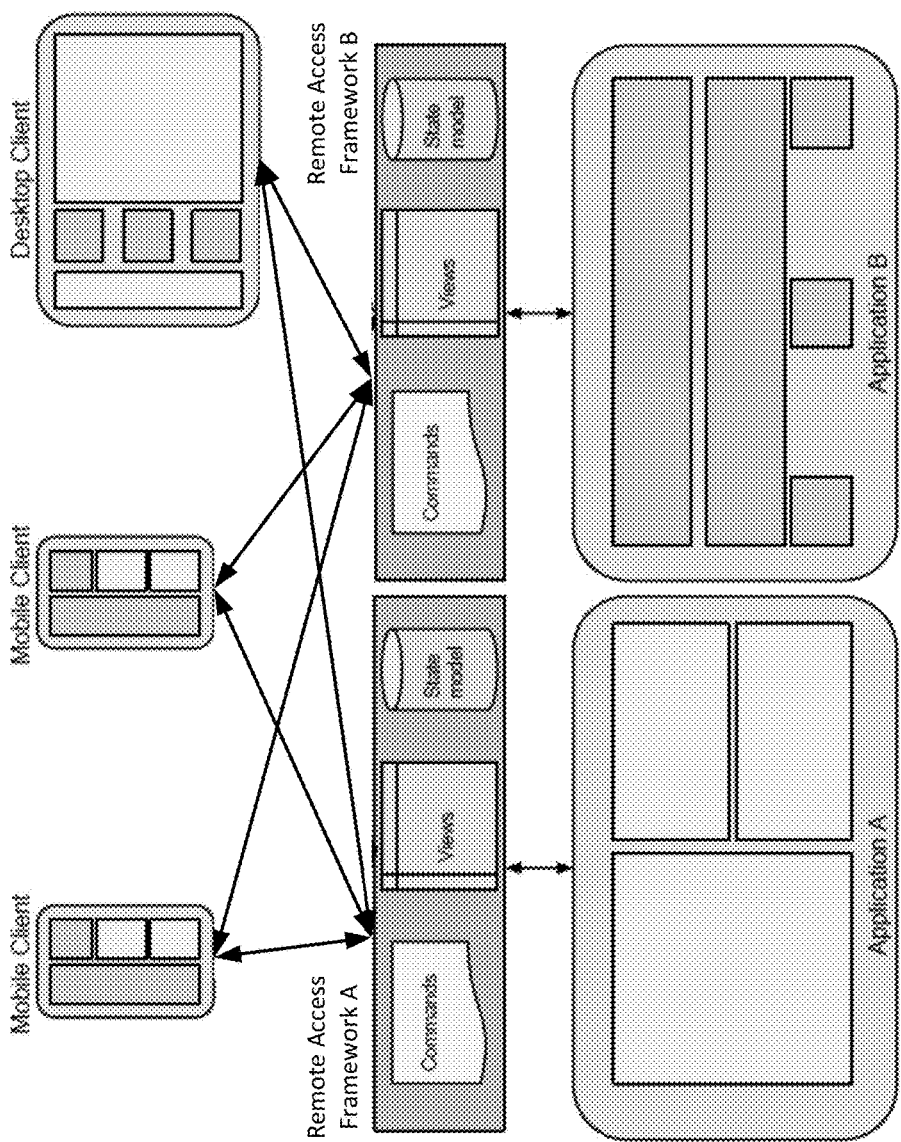
FIG. 6B is another block diagram illustrating recombination of a plurality of application programs according to implementations described herein.

Referring now to FIGS. 6A and 6B, block diagrams illustrating recombination of a plurality of application programs according to implementations described herein are shown. As shown in FIG. 6A, a client (e.g., client computer 102) remotely accesses a plurality of applications programs A and B (e.g., application programs 124A and 124B running on at least one server such as server computer 120A and/or server computer 120B) over a network (e.g., network 112). The client can remotely access the application programs A and B using a remote access framework such as described with respect to FIG. 4 (e.g., using client and server remote access application(s)) and FIG. 5 (e.g., using a state model). As described above, the client can remotely access the application programs via respective URLs associated with the application programs. As shown in FIG. 6B, a plurality of clients (e.g., two mobile devices and a desktop client) remotely accesses a plurality of applications programs A and B over a network. In addition, each of the clients in FIG. 6B is capable of natively displaying application programs A and B. Optionally, in FIGS. 6A and 6B, PUREWEB technology of CALGARY SCIENTIFIC of Calgary, AB, Canada can provide the remote access framework. For example, in FIGS. 6A and 6B, remote access framework A and remote access framework B are provided for application programs A and B, respectively. As shown in FIG. 6B, the remote access framework can be used to pass commands, views, and/or state information between the client and the application programs A and B. The remote access framework can be used to recombine application programs A and B into a single user interface as described herein.

Recombination of application programs A and B can include linking views (e.g., display data including but not limited to interactive zones) and/or application state. This is shown by the dotted line in FIG. 6A. Recombination can also include implementing commands in each of application programs A and B. For example, recombination enables an understanding of the application functionality of application programs A and B when views and/or application state are linked, and therefore, commands entered in application program A or B can be executed in the other application program B or A, for example, by automatically generating the same command in the other program. Example pseudocode for linking views of application programs A and B is provided below:

```
// create first view...
var view1 = new rasframework.client.View({id: 'myView1', viewName: 'myView1'});
// create second view...
var view2 = new rasframework.client.View({id: 'myView2', viewName: 'myView2'});
// now link the two views.
rasframework.client.linkViews(view1, view2);
//...now all input operations (e.g., mouse/keyboard operations) in one view will be
//automatically reflected in the other view
// now unlink the two views...
rasframework.client.unlinkViews(view1, view2);
```

This disclosure contemplates that when application program views (e.g., View1 and View2 above) are linked, it is possible to generate operations received in one linked application program in the other linked application program. For example, with reference to FIGS. 6A and 6B, application programs A and B are linked. When a user performs an operation in the view of application program A on the single user interface (e.g., a scroll operation), the user input is passed through the remote access framework (e.g., remote access framework A) to application program A. Since application programs A and B are linked, a corresponding command can be automatically generated and passed, for example by the remote access framework (e.g., remote access framework B), to perform the same operation (e.g., a scroll operation) in application program B. Thereafter, respective application data and/or presentation data for each of application programs A and B can be generated by the remote application frameworks and then integrated into the single user interface. Thus, it is the understanding of application functionality provided by recombination that allows the linking of interactive functionalities of application programs A and B. It should be understood that the scroll operation is described as the interactive functionality as an example only and that other interactive functionalities of the application programs can be linked using the systems and methods described herein.

Example pseudocode for linking application state of application programs A and B is provided below:

```
// specify application state variable in first framework
var framework1 = rasframework.getFramework(0);
framework1.getState().setValue('ScribbleColor', 'red');
// specify application state variable in second framework
var framework2 = rasframework.getFramework(1);
framework2.getState().setValue('lineColor', 'blue');
// now specify link the application state
rasframework.frameworks.linkState(framework1, 'ScribbleColor', framework2, 'lineColor');
```

Alternatively or additionally, this disclosure contemplates linking application state information of the application programs. For example, with reference to FIGS. 6A and 6B, application programs A and B are linked. In some implementations, this includes linking logical elements (e.g., a menu, submenu, button, etc.) of application programs A and B that correspond to the same interactive functionality (e.g., linking the same interaction zone of application programs A and B). In other implementations, this includes linking logical elements that are similar, but different, in application programs A and B. In other words, this includes linking logical elements that are related but not necessarily the same such as the red ScribbleColor and the blue lineColor in the pseudocode above. For example, the red ScribbleColor and the blue lineColor may optionally correspond to mark-ups in respective images stored and displayed by application programs A and B. Changes to the linked application state information (e.g., the red ScribbleColor and the blue line-Color) can be passed to through the remote access framework (e.g., remote access framework A and/or remote access framework B) to the application programs A and/or B. Thereafter, respective application data and/or presentation data for each of application programs A and B can be generated by the remote application frameworks and then integrated into the single user interface. Thus, it is the understanding of application functionality provided by recombination that allows the linking of application state information of application programs A and B.

Example Use Cases

As described above, using the systems and methods described herein, it is possible to recombine a plurality of application programs. In some implementations, the application programs can be applications for viewing medical images of a patient and for entering a diagnostic report into a respective patient application file. In other implementations, the application programs can be applications for viewing three-dimensional (3D) and two-dimensional (2D) computer-aided designs (CAD) images. It should be understood that these application programs are provided only as examples. Other non-limiting examples for the use of application program recombination as described herein include:

a. Recombination can be used for enterprise application integration (i.e., integrating application programs across an enterprise).

b. Two (or more) application programs running simultaneously for displaying a prior study and a current study using simultaneously two displays.

c. When data common to two (or more) application programs (e.g., patient name data) is changed in one application, an event is automatically generated in the other application(s) that causes the common data (e.g., patient name data) to also be changed in the other application(s).

d. Commonality can be purely user interaction, e.g., two viewer application programs that both use the same input command (e.g., the arrow keys) to scroll through documents and/or images.

e. A user (e.g., physician) launches a recombined viewer application to access two different servers at two different hospitals, where the same patient's images are displayed in two views within a single client browser window. In response to pan or scroll operation, the recombined viewer application sends appropriate commands to each independent application at the independent servers.

f. A quality assurance (QA) application that displays and affects multiple silo/databases simultaneously without requiring health level seven (HL7) messaging to perform updates. This may be useful for QA of data maintained in separate applications of the same enterprise.

g. A PACS workstation that can also pop-up windows from the same vendor's nuclear medicine viewer.

h. A universal worklist, e.g., a worklist coming from different vendors for a common worklist display for a single radiologist reading from multiples hospitals. For example, a viewer that displays the worklist from a modality in the same browser as the worklist from the radiology information system (RIS), both coming from different vendors, each required to be correct as it was generated by the modality or RIS directly. The worklist can be displayed in a window, tile, area, etc. of the user interface or display. It should be understood that there would be no delay or opportunity for database mistakes during worklist collection into a third party environment using the systems and methods described herein.

i. A universal worklist display for a single radiologist reading from multiple hospitals, where the radiologist's credentials are stored and passed to each of the relevant hospital's RIS viewers. Each of the RIS viewers are stripped down and then displayed in a respective window, tile, box, area, etc. of the user interface or display. In this example, the worklists are not merged (as in example (h) above) and instead are just displayed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing recombination of a plurality of application programs, comprising:

providing a remote access framework for enabling a client to remotely access the plurality of application programs over a network, the plurality of application programs running on at least one server;

receiving a communication from the client through the remote access framework, the communication requesting access to the plurality of application programs;

maintaining a state model within the remote access framework, the state model comprising respective application states of the plurality of application programs;

using the state model, linking interactive functionalities of the plurality of application programs;

using the state model, generating display data indicative of a single user interface including the plurality of application programs; and communicating the display data to the client through the remote access framework.

2. The method of claim 1, further comprising:

receiving user input data from the client through the remote access framework;

using the state model, determining an association of the user input data to a respective interaction zone; and providing the user input data to at least one of the plurality of application programs associated with the respective interaction zone through the remote access framework.

3. The method of claim 2, further comprising:

receiving application program data from the at least one of the plurality of application programs through the remote access framework, the application program data being in dependence upon the user input data, wherein the display data is generated in dependence upon the application program data for displaying the application program data using the single user interface.

4. The method of claim 2, wherein the user input data are simultaneously provided to the at least two of the plurality of application programs associated with the single interaction zone.

5. The method of claim 2, further comprising:

receiving first application program data and second application program data from a first application program and a second application program, respectively, through the remote access framework, wherein the display data is generated in dependence upon the first application program data and the second application program data for displaying the first application program data and the second application program data using the single user interface.

6. The method of claim 5, wherein the display data are generated for simultaneously displaying the first application program data and the second application program data using the single user interface.

7. The method of claim 1, further comprising:

receiving user input data from the client through the remote access framework;

using the state model, determining an association of the user input data to first application program data associated with a first application program and to second application program data associated with a second application program; and providing the user input data to the first and second application programs, wherein the first and second application program data are modified according to the user input data.

8. The method of claim 2, wherein the association of the user input data to the respective interaction zone is determined based on a location of the respective interaction zone on a graphical display image of the client.

9. The method of claim 8, wherein the association of the user input data to the respective interaction zone is determined in a pixel-wise fashion.

10. The method of claim 1, wherein the interactive functionalities are a subset of a plurality of functionalities of at least one of the plurality of application programs.

11. A non-transitory computer-readable medium having computer-executable instructions stored thereon for recombination of a plurality of application programs that, when executed by a processor, cause the processor to:
provide a remote access framework for enabling a client to remotely access the plurality of application programs over a network, the plurality of application programs running on at least one server;
receive a communication from the client through the remote access framework, the communication requesting access to the plurality of application programs;
maintain a state model within the remote access framework, the state model comprising respective application states of the plurality of application programs;
using the state model, link interactive functionalities of the plurality of application programs;
using the state model, generate display data indicative of a single user interface including the plurality of application programs; and
communicate the display data to the client through the remote access framework.

12. The non-transitory computer-readable medium of claim 11, having further computer-executable instructions stored thereon that, when executed by the processor, cause the processor to:
receive user input data from the client through the remote access framework;
using the state model, determine an association of the user input data to a respective interaction zone; and
provide the user input data to at least one of the plurality of application programs associated with the respective interaction zone through the remote access framework.

13. The non-transitory computer-readable medium of claim 12, having further computer-executable instructions stored thereon that, when executed by the processor, cause the processor to:
receive application program data from the at least one of the plurality of application programs through the remote access framework, the application program data being in dependence upon the user input data, wherein the display data is generated in dependence upon the application program data for displaying the application program data using the single user interface.

14. The non-transitory computer-readable medium of claim 12, wherein the user input data are simultaneously provided to the at least two of the plurality of application programs associated with the single interaction zone.

15. The non-transitory computer-readable medium of claim 12, having further computer-executable instructions stored thereon that, when executed by the processor, cause the processor to:
receive first application program data and second application program data from a first application program and a second application program, respectively, through the remote access framework, wherein the display data is generated in dependence upon the first application program data and the second application program data for displaying the first application program data and the second application program data using the single user interface.

16. The non-transitory computer-readable medium of claim 15, wherein the display data are generated for simultaneously displaying the first application program data and the second application program data using the single user interface.

17. The non-transitory computer-readable medium of claim 11, having further computer-executable instructions stored thereon that, when executed by the processor, cause the processor to:
receive user input data from the client through the remote access framework;
using the state model, determine an association of the user input data to first application program data associated with a first application program and to second application program data associated with a second application program; and
provide the user input data to the first and second application programs, wherein the first and second application program data are modified according to the user input data.

18. The non-transitory computer-readable medium of claim 12, wherein the association of the user input data to the respective interaction zone is determined based on a location of the respective interaction zone on a graphical display image of the client.

19. The non-transitory computer-readable medium of claim 18, wherein the association of the user input data to the respective interaction zone is determined in a pixel-wise fashion.

20. The non-transitory computer-readable medium of claim 11, wherein the interactive functionalities are a subset of a plurality of functionalities of at least one of the plurality of application programs.

* * * * *